United States Patent
Todd et al.

(10) Patent No.: US 10,671,360 B1
(45) Date of Patent: *Jun. 2, 2020

(54) RESOURCE-AWARE COMPILER FOR MULTI-CLOUD FUNCTION-AS-A-SERVICE ENVIRONMENT

(71) Applicant: EMC IP Holding Company LLC, Hopkinton, MA (US)

(72) Inventors: Stephen J. Todd, Shrewsbury, MA (US); Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/894,387

(22) Filed: Feb. 12, 2018

Related U.S. Application Data

(63) Continuation-in-part of application No. 15/802,692, filed on Nov. 3, 2017.

(51) Int. Cl.
   *G06F 8/41* (2018.01)
   *H04L 29/08* (2006.01)
   (Continued)

(52) U.S. Cl.
   CPC ............ *G06F 8/41* (2013.01); *G06F 9/5027* (2013.01); *G06F 9/541* (2013.01); *H04L 67/10* (2013.01); *H04L 67/327* (2013.01)

(58) Field of Classification Search
   None
   See application file for complete search history.

(56) References Cited

U.S. PATENT DOCUMENTS

| 2011/0282940 | A1 | 11/2011 | Zhang et al. |
| 2014/0215075 | A1* | 7/2014 | Lee ................ H04L 47/125 709/226 |

(Continued)

OTHER PUBLICATIONS

U.S. Appl. No. 15/802,692, filed in the name of Stephen Todd et al. on Nov. 3, 2017 and entitled "Compiler for Multi-Cloud Function-as-a-Service Environment."
AWS, "AWS Lambda Developer Guide," Amazon Web Services, Inc., 2017, 494 pages.
Wikipedia, "Function as a Service," https://en.wikipedia.org/w/index.php?title=Function_as_a_service&oldid=802616111, Sep. 27, 2017, 1 page.

(Continued)

*Primary Examiner* — Charles E Anya
(74) *Attorney, Agent, or Firm* — Ryan, Mason & Lewis, LLP

(57) ABSTRACT

In a multi-cloud computing environment including a plurality of cloud platforms, wherein each of the cloud platforms supports a different cloud-specific application function model that enables execution of cloud-specific application functions thereon, a method obtains a set of cloud-neutral application functions developed in accordance with a cloud-neutral application function model. The method then translates the set of cloud-neutral application functions into a set of cloud-specific application functions, wherein at least one cloud-specific application function of the set of cloud-specific application functions is executable on a corresponding one of the cloud platforms and another cloud-specific application function of the set of cloud-specific application functions is executable on another corresponding one of the cloud platforms. Further, the corresponding cloud platforms are selected based on one or more resource constraints and/or one or more resource costs.

20 Claims, 10 Drawing Sheets

(51) Int. Cl.
*G06F 9/50* (2006.01)
*G06F 9/54* (2006.01)

(56) References Cited

U.S. PATENT DOCUMENTS

| | | | |
|---|---|---|---|
| 2015/0347100 A1 | 12/2015 | Quine | |
| 2016/0021019 A1* | 1/2016 | Parikh | G06F 9/45558 709/226 |
| 2017/0024396 A1* | 1/2017 | Adarsh | G06Q 10/04 |
| 2017/0139791 A1 | 5/2017 | Hagan et al. | |
| 2017/0161062 A1 | 6/2017 | Banerjee et al. | |
| 2017/0286523 A1* | 10/2017 | Lee | G06F 16/1824 |
| 2017/0302589 A1 | 10/2017 | Leafe et al. | |
| 2017/0339013 A1* | 11/2017 | Allen | H04L 41/046 |
| 2017/0351546 A1* | 12/2017 | Habak | G06F 9/5027 |
| 2018/0115551 A1* | 4/2018 | Cole | H04L 63/10 |
| 2018/0123964 A1 | 5/2018 | Kore et al. | |
| 2018/0287892 A1* | 10/2018 | Hall | H04L 41/5019 |
| 2018/0321918 A1 | 11/2018 | McClory et al. | |

OTHER PUBLICATIONS

"Integrate with Google Cloud Platform," https://firebase.google.com/docs/storage/gcp-integration, Oct. 31, 2017, 7 pages.

"Create a Serverless API Using Azure Functions," https://docs.microsoft.com/en-us/azure/azure-functions/functions-create-serverless-api, May 4, 2017, 6 pages.

Github, "System Overview," https://github.com/apache/incubator-openwhisk/blob/master/docs/about.md, Sep. 2017, 5 pages.

Marco Parenzan, "Microsoft Azure Functions vs. Google Cloud Functions vs. AWS Lambda: Fight for Serverless Cloud Domination Continues," https://cloudacademy.com/blog/microsoft-azure-functions-vs-google-cloud-functions-fight-for-serverless-cloud-domination-continues/, Feb. 21, 2017, 18 pages.

medium.com, "Serverless Showdown: AWS Lambda vs. Firebase Google Cloud Functions," https://medium.com/@ste.grider/serverless-showdown-aws-lambda-vs-firebase-google-cloud-functions-cc7529bcfa7d, Jun. 8, 2017, 10 pages.

Wikipedia, "Profiling (Computer Programming)," https://en.wikipedia.org/w/index.php?title=Profiling_(computer_programming)&oldid+801697263, Sep. 21, 2017, 5 pages.

\* cited by examiner

```
<NotificationConfiguration>
  <QueueConfiguration>
    <Id>1</Id>
    <Filter>
      <FilterRule>
        <Name>prefix</Name>
        <Value>images/</Value>
      </FilterRule>
      <FilterRule>
        <Name>suffix</Name>
        <Value>jpg</Value>
      </FilterRule>
    </Filter>
    <S3Key>
    </S3Key>
    <Queue>arn:aws:sqs:us-west-2:444555666:s3notificationqueue</Queue>
    <Event>s3:ObjectCreated:Put</Event>
  </QueueConfiguration>
</NotificationConfiguration>
``` https://openwhisk.ng.bluemix.net/api...

902 — IN A MULTI-CLOUD COMPUTING ENVIRONMENT COMPRISING A PLURALITY OF CLOUD PLATFORMS, WHEREIN EACH OF THE CLOUD PLATFORMS SUPPORTS A DIFFERENT CLOUD-SPECIFIC APPLICATION FUNCTION MODEL THAT ENABLES EXECUTION OF CLOUD-SPECIFIC APPLICATION FUNCTIONS THEREON; OBTAIN A SET OF CLOUD-NEUTRAL APPLICATION FUNCTIONS DEVELOPED IN ACCORDANCE WITH A CLOUD-NEUTRAL APPLICATION FUNCTION MODEL

904 — TRANSLATE THE SET OF CLOUD-NEUTRAL APPLICATION FUNCTIONS INTO A SET OF CLOUD-SPECIFIC APPLICATION FUNCTIONS THAT ARE EXECUTABLE ACROSS TWO OR MORE OF THE PLURALITY OF CLOUD PLATFORMS OF THE MULTI-CLOUD COMPUTING ENVIRONMENT, WHEREIN AT LEAST ONE CLOUD-SPECIFIC APPLICATION FUNCTION OF THE SET OF CLOUD-SPECIFIC APPLICATION FUNCTIONS IS EXECUTABLE ON A CORRESPONDING ONE OF THE CLOUD PLATFORMS AND ANOTHER CLOUD-SPECIFIC APPLICATION FUNCTION OF THE SET OF CLOUD-SPECIFIC APPLICATION FUNCTIONS IS EXECUTABLE ON ANOTHER CORRESPONDING ONE OF THE CLOUD PLATFORMS, AND FURTHER WHEREIN THE CORRESPONDING CLOUD PLATFORMS FOR WHICH THE CLOUD-NEUTRAL APPLICATION FUNCTIONS ARE TRANSLATED ARE SELECTED BASED ON AT LEAST ONE OF ONE OR MORE RESOURCE CONSTRAINTS AND ONE OR MORE RESOURCE COSTS ASSOCIATED WITH EACH OF THE PLURALITY OF CLOUD PLATFORMS

FIG. 9

RESOURCE-AWARE COMPILER FOR MULTI-CLOUD FUNCTION-AS-A-SERVICE ENVIRONMENT

CROSS REFERENCE TO RELATED APPLICATION

The present application is a continuation-in-part of, and therefore claims priority to, U.S. patent application Ser. No. 15/802,692, entitled "Compiler for Multi-Cloud Function-as-a-Service Environment" filed Nov. 3, 2017, the disclosure of which is incorporated by reference herein in its entirety.

FIELD

The field relates generally to multi-cloud computing environments, and more particularly to techniques for application function development in such multi-cloud computing environments.

BACKGROUND

Enterprises such as corporations typically utilize a cloud computing environment to manage their applications, services and data. One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, enterprises may choose to host their applications, services and data on a combination of private and public clouds that form a multi-cloud computing environment.

Function-as-a-Service or FaaS is a cloud computing service model on a given cloud platform that enables a user to develop, deploy, execute, and otherwise manage application functions without many of the drawbacks of provisioning and maintaining infrastructure associated with development and deployment of a full application program.

Various public cloud providers offer FaaS implementations with their specific cloud platforms, e.g., Lambda® for Amazon Web Services® (AWS) cloud platforms, Firebase® for Google Compute Engine® (GCE) cloud platforms, Azure® Functions for Microsoft® cloud platforms, and Bluemix OpenWhisk® for IBM® cloud platforms. Each such FaaS implementation is designed for exclusive use on a specific public cloud platform with its own dedicated programming language and function definitions, i.e., its own cloud-specific FaaS model. This can provide challenges to developers seeking to deploy application functions in a multi-cloud computing environment. Furthermore, as developers write applications using FaaS models, they experience different resource (e.g., memory/compute) limits and pricing models across different cloud platforms.

SUMMARY

Embodiments of the invention provide systems and methods for resource-aware cloud-neutral application function development in multi-cloud computing environments.

For example, in one embodiment, a method comprises the following steps. In a multi-cloud computing environment comprising a plurality of cloud platforms, wherein each of the cloud platforms supports a different cloud-specific application function model that enables execution of cloud-specific application functions thereon, the method obtains a set of cloud-neutral application functions developed in accordance with a cloud-neutral application function model. The method then translates the set of cloud-neutral application functions into a set of cloud-specific application functions that are executable across two or more of the plurality of cloud platforms of the multi-cloud computing environment, wherein at least one cloud-specific application function of the set of cloud-specific application functions is executable on a corresponding one of the cloud platforms and another cloud-specific application function of the set of cloud-specific application functions is executable on another corresponding one of the cloud platforms. Further, the corresponding cloud platforms for which the cloud-neutral application functions are translated are selected based on at least one of one or more resource constraints and one or more resource costs associated with each of the plurality of cloud platforms.

Advantageously, illustrative embodiments provide a resource-aware cloud-neutral application function development framework that automatically assists a developer in the generation of optimal code for leveraging constrained FaaS resources associated with such resources across different cloud platforms, as well as additionally or alternatively considering the costs associated with such resources. The framework is therefore "resource-aware" in that it may consider, for example, both resource constraints and resource costs, resource constraints alone, or resource costs alone, in making the cloud platform and code selections.

These and other features and advantages of the invention will become more readily apparent from the accompanying drawings and the following detailed description.

BRIEF DESCRIPTION OF THE DRAWINGS

FIG. 4 illustrates an example of program code with altered cloud-specific function constructs needed to implement the chain of function executions across multiple clouds of FIG. 3.

FIG. 9 illustrates a methodology for resource-aware cloud-neutral application function development in a multi-cloud computing environment, according to illustrative embodiments.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. As mentioned above, a multi-cloud computing environment employed by an enterprise may comprise a combination of private and public clouds. The term "enterprise" as used herein is intended to be broadly construed, and may comprise, for example, one or more businesses, one or more corporations or any other one or more entities, groups, or organizations. An "entity" as illustratively used herein may be a person or system.

Illustrative embodiments provide techniques for cloud-neutral application function development in a multi-cloud computing environment. An example of such a multi-cloud computing environment with such application function development is shown in FIG. 1.

Figure 1:
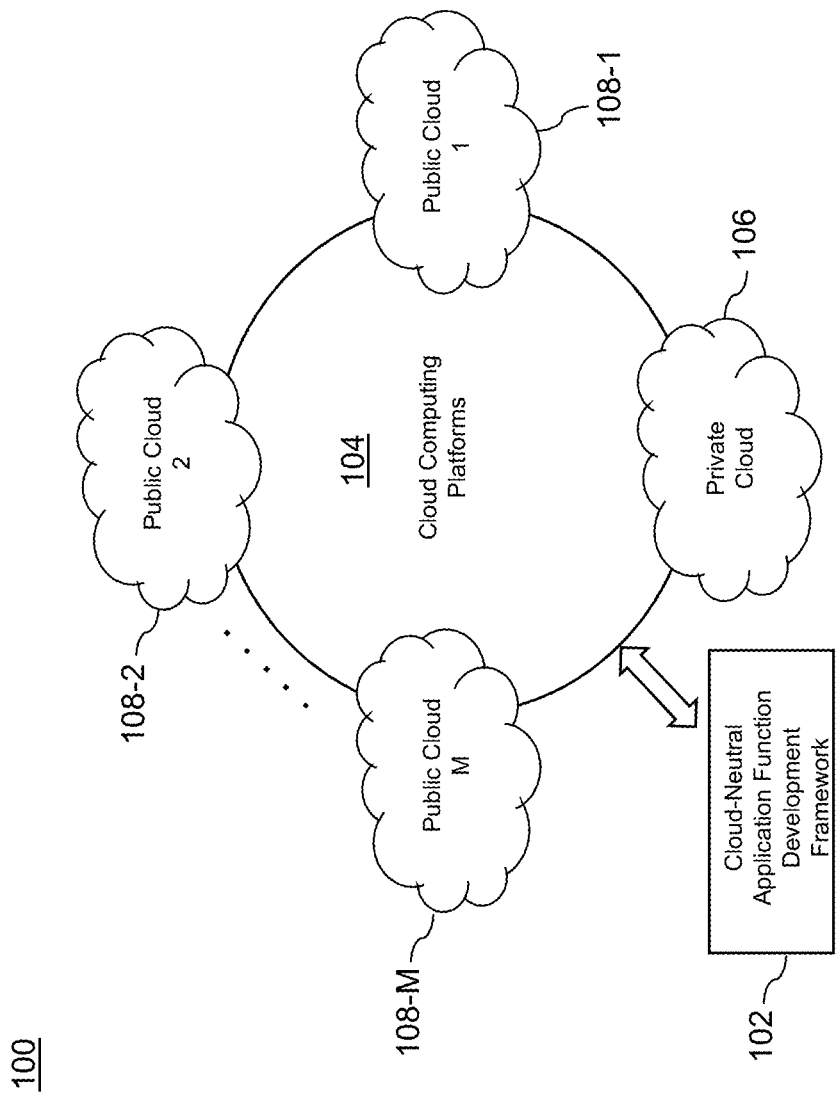
FIG. 1 illustrates a multi-cloud computing environment with cloud-neutral application function development framework, according to an illustrative embodiment.

More particularly, as shown in FIG. 1, multi-cloud computing environment 100 comprises a cloud-neutral application function development framework 102 and a set of cloud computing platforms 104 upon which an application developer (for example, but not limited to, a developer associated with an enterprise) wishes to deploy one or more applications and data assets.

The set of cloud computing platforms 104 comprises, in this illustrative embodiment, a private cloud 106 and a plurality of public clouds 108-1, 108-2, . . . , 108-M. It is to be appreciated, however, that there can be more than one private cloud or no private cloud in the multi-cloud computing environment 100, as well as fewer public clouds. Private cloud 106 may be controlled by the application developer (e.g., enterprise). Examples of public clouds may include, but are not limited to, Amazon Web Services® (AWS), Google Compute Engine® (GCE), Windows Azure® Services platforms, and IBM Bluemix® platforms. As mentioned above, each of public clouds 108-1, 108-2, . . . , 108-M provide their own cloud-specific FaaS model with a dedicated programming language and cloud-specific function definitions.

As will be explained in detail below, the cloud-neutral application function development framework 102 provides the application developer with a cloud-neutral FaaS development model that normalizes the cloud-specific functions of each public cloud 108-1, 108-2, . . . , 108-M, allowing the developer to write cloud-neutral FaaS application logic (i.e., code) to execute functions across multiple clouds. In illustrative embodiments, the framework 102 provides a compiler configured to parse and translate the cloud-neutral FaaS application logic into the corresponding cloud-specific functions of two or more of the public clouds 108-1, 108-2, . . . , 108-M so the functions can be deployed and executed on those two or more public clouds. In this way, the framework 102 enables interoperability between multiple clouds with respect to a chain of function executions. Further, in illustrative embodiments, the framework 102 provides an automated recommendation for deployment of the translated functions. Detailed features of framework 102 will be described in further detail below.

Before describing illustrative embodiments of a cloud-neutral application function development framework, some problems associated with existing cloud-specific FaaS application development will be described.

Figure 2:
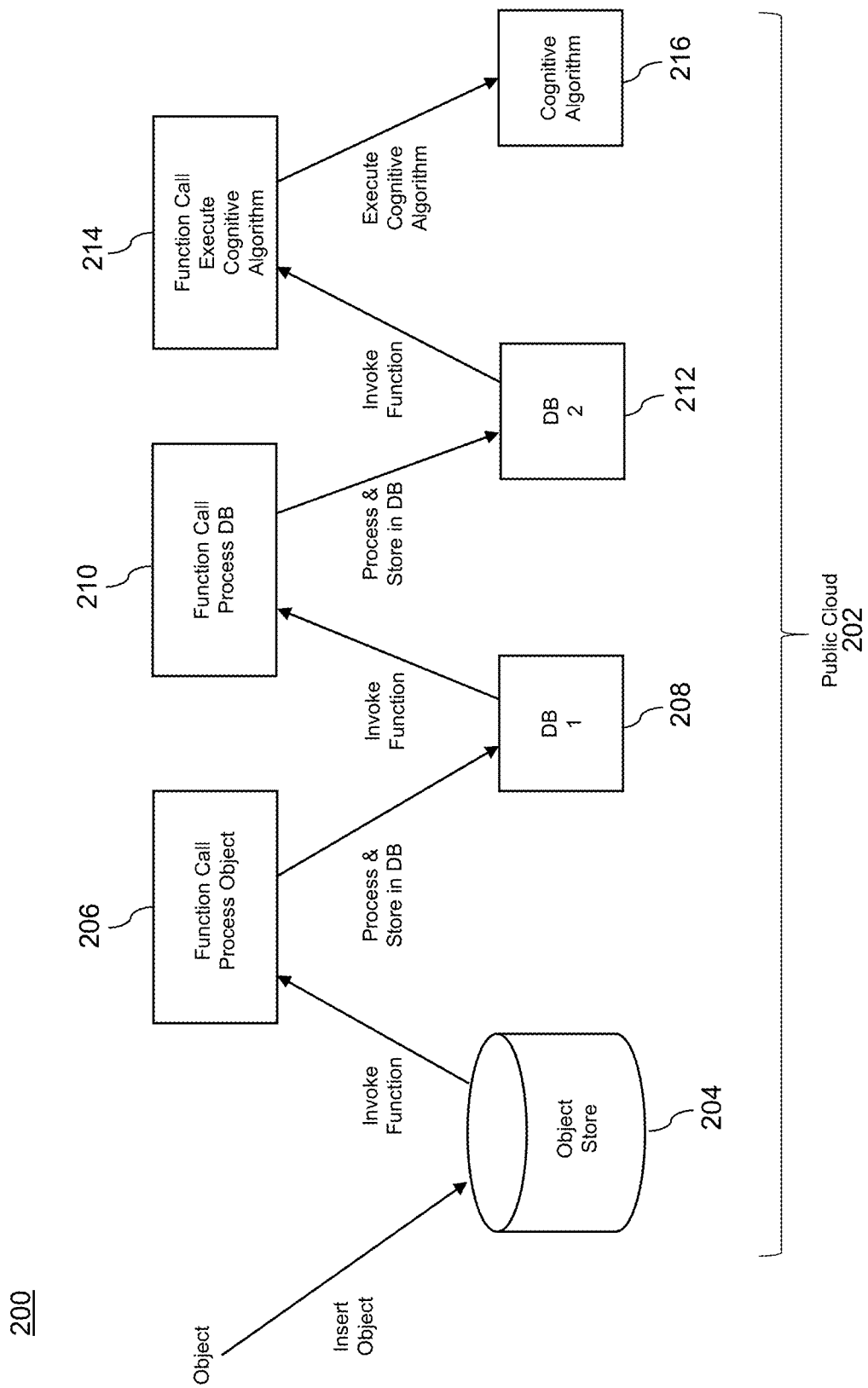
FIG. 2 illustrates an example of a single cloud computing environment with actions triggered by a chain of function executions.

FIG. 2 illustrates an example 200 of a single cloud computing environment with actions triggered by a chain of cloud-specific function executions. More particularly, FIG. 2 illustrates a multi-step FaaS chain of function executions within a single public cloud platform 202 (e.g., public cloud 1 in FIG. 1). The chain is initiated by an action, i.e., insertion of an object (e.g., a JPEG image file) in an object store 204. The insert object action triggers a function call 206 to process and store the object in a first database 208 (DB1 which can be, for example, a Structured Query Language or SQL database). Storage in the first database 208 triggers a function call 210 to process and store data in a second database 212 (DB2 which can be, for example, a document-oriented or NoSQL database). Storage in the second database 212 triggers a function call 214 to execute a cognitive algorithm 216 on the data. The FaaS platform associated with the public cloud 202 handles the provisioning of these functions.

In order to execute this chain of function executions in example 200, the application developer uses the specific FaaS model for the public cloud in which the functions are to be executed. Thus, advantageously, the FaaS model for a given single cloud platform enables an application developer to develop and deploy this chain of function executions without the complexities associated with managing infrastructure for development and launch of an actual application. This is a reason why a FaaS model is sometimes referred to as a "serverless" model.

Despite the benefits of a FaaS model, several problems arise due to the cloud-specific FaaS constructs that the developer must use in creating a chain of function executions.

FaaS Application Programming Interfaces (APIs) are Single Cloud Only.

A developer that wishes to leverage the benefit of FaaS must commit to one (and only one) cloud. This prevents the developer from leveraging superior or unique services that may be present in other clouds.

Lack of FaaS Portability.

Functions that are deployed in one cloud platform cannot be transported and executed in other cloud platforms. This represents a step backward from the flexibility offered by traditional multi-cloud application development/deployment tools such as CloudFoundry®.

Inability to Leverage Non-Native Emerging Services.

As multiple cloud providers develop valuable new services for developers, these services are inaccessible to developers that are writing FaaS logic using a different native API.

Lack of Access to Competitive Pricing.

Every FaaS call comes with an associated cost that is payable to the FaaS cloud provider. Developers are not able to access discounted functions from competitive providers. It is realized herein that such discounted functions could result in reduced costs for FaaS clients.

Differing Performance Capabilities.

Different cloud platforms have different performance capabilities (e.g., due to recently introduced advanced hardware accelerators). The most appropriate performance levels for different phases of an application may exist in different clouds, and are therefore inaccessible using the existing cloud-specific FaaS approach.

Multi-Cloud Modeling and Placement.

As developers write a single function (or chains of functions as depicted in FIG. 2), there is no existing method for modeling these functions on a variety of cloud platforms to determine which cloud is the most suitable target.

Programming Language Disparity.

Different FaaS cloud providers support different FaaS programming languages (e.g., Java, Python, etc.). The disparity in languages can also be a roadblock to portability when moving code to a new cloud platform.

Multi-Cloud Deployment.

As developers write a single function (or chains of functions as depicted in FIG. 2), there is no existing method for deploying the functions across multiple clouds in a way that achieves optimal advantage (e.g., business advantage) to an enterprise.

Seamless Data Movement for Multi-Cloud Deployments.

Executing chains of FaaS logic across multiple clouds is not feasible with existing approaches due to the potential need to perform data copies as part of a pipeline of operations. For example, assume that the cognitive algorithm 216 in FIG. 2 resides on a different cloud platform than the second database (DB2) 212. This would require copying data from the second database 212 residing in a first cloud and sending the data copy to a second cloud where the cognitive algorithm is deployed. Current cloud-specific FaaS models do not provide for such data movement.

Figure 3:
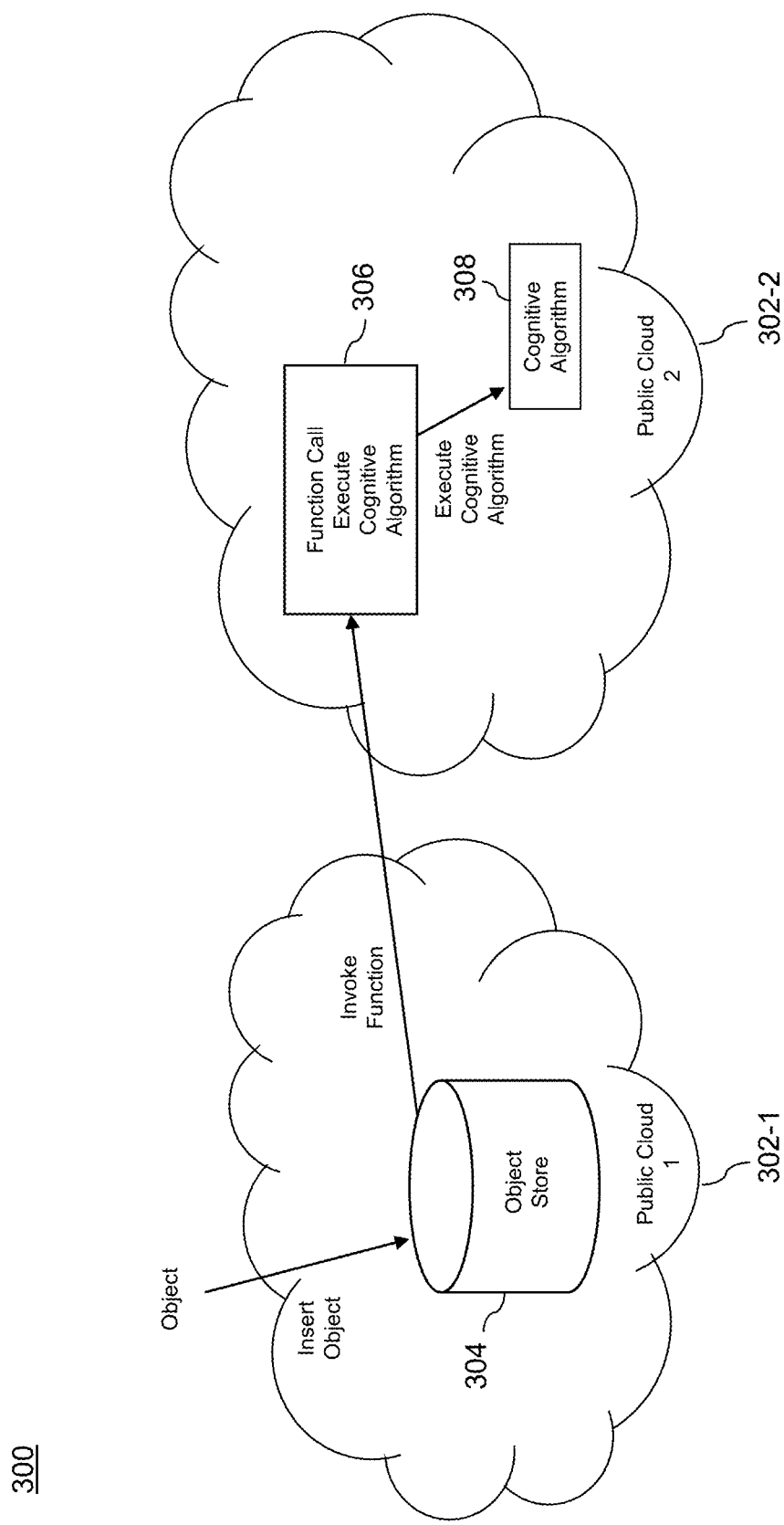
FIG. 3 illustrates an example of a multi-cloud computing environment with actions triggered by a chain of function executions across multiple clouds, according to an illustrative embodiment.

Turning now to FIG. 3, an example 300 is illustrated of a multi-cloud computing environment with actions triggered by a chain of function executions across multiple clouds, according to an illustrative embodiment. In comparison to the chain of function executions in the single public cloud 202 in FIG. 2, example 300 illustrates interoperability between multiple clouds, i.e., public cloud 1 (302-1) and public cloud 2 (302-2), to allow a chain of function executions across the multiple clouds.

More particularly, as shown in the example of FIG. 3, an object (e.g., a JPEG image file) is inserted in an object store 304 in public cloud 302-1, e.g., an Amazon Web Services® (AWS) cloud platform supporting a Lambda® FaaS model. A FaaS trigger causes a function call 306 to a cognitive algorithm 308 on public cloud 302-2, e.g., a cognitive analysis of the image on Bluemix OpenWhisk® for an IBM® cloud platform.

In the context of example 300 described above, FIG. 4 illustrates an example of why multi-cloud interoperability with respect to FaaS models is currently prohibitive in nature to achieve. More particularly, program code 400 includes AWS Lambda® FaaS constructs with altered cloud-specific function constructs that would be needed to implement the chain of function executions across the multiple clouds 302-1 (AWS® cloud) and 302-2 (IBM Bluemix® cloud) of example 300 in FIG. 3. That is, the AWS-specific example in FIG. 4 shows the registration of a FaaS action whenever a JPEG image file is stored in the "images" directory. The oval shapes highlight AWS®-specific language. The rectangle shapes highlight the needed change to the AWS®-specific language to execute an OpenWhisk® FaaS action on the IBM Bluemix® cloud platform instead of triggering the entry of the new JPEG image file into an AWS® queue. It is realized that requiring modification of cloud-specific FaaS code of a public cloud provider for a given chain of function executions that an application developer wishes to be executed across multiple cloud platforms is not feasible.

Figure 5:
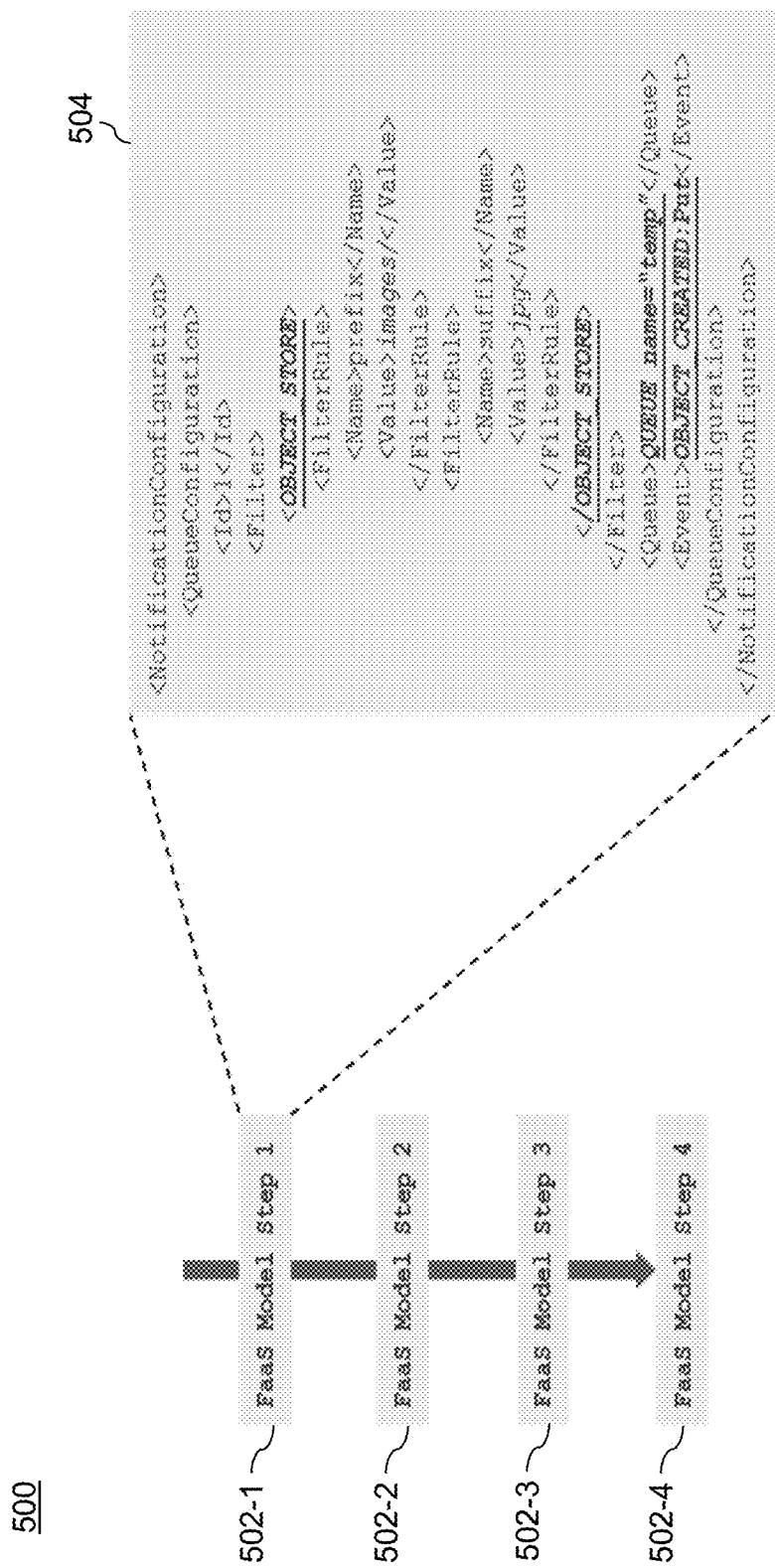
FIG. 5 illustrates an example of program code with cloud-neutral function constructs, according to an illustrative embodiment.
Figure 6:
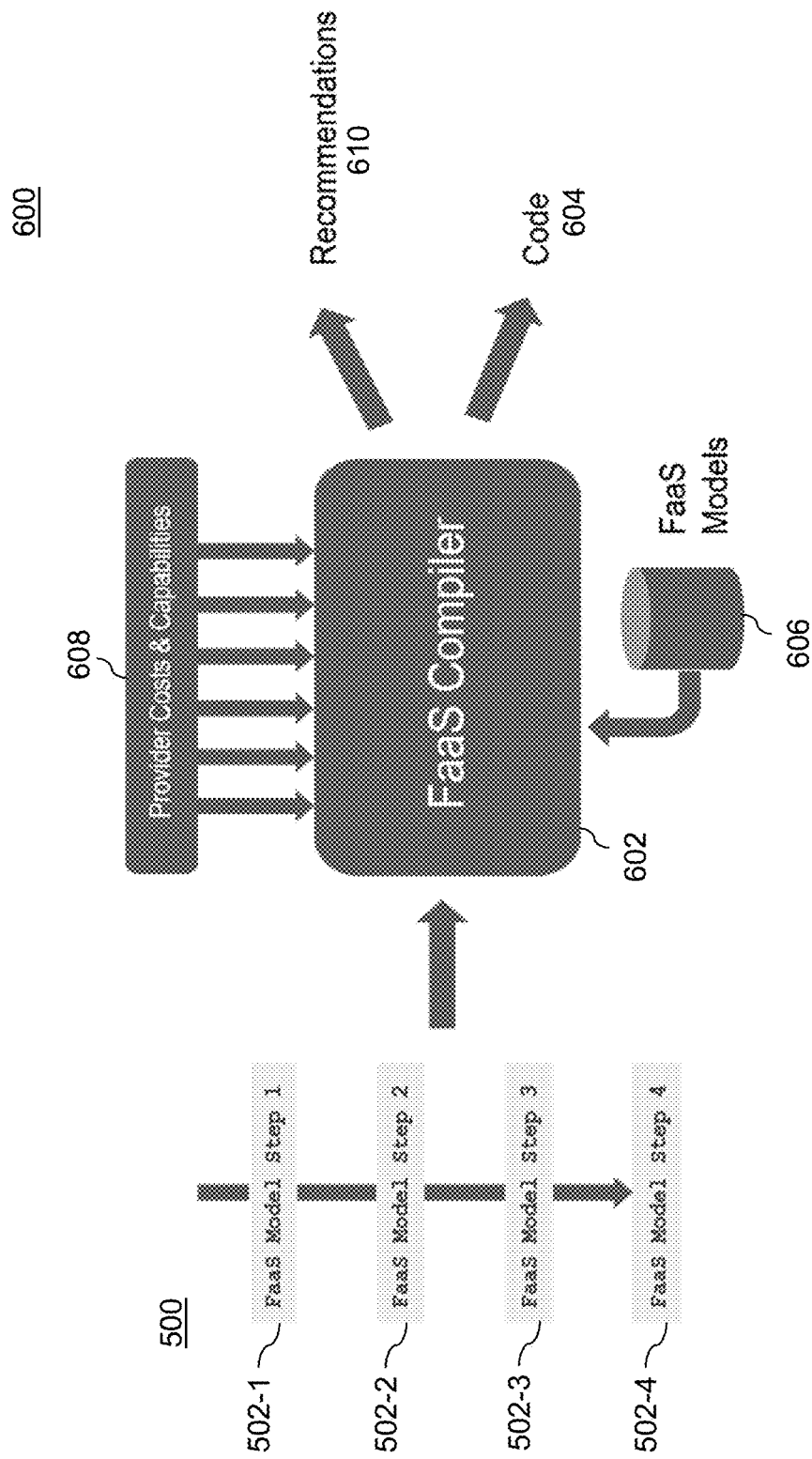
FIG. 6 illustrates a cloud-neutral application function development framework, according to an illustrative embodiment.

Illustrative embodiments overcome the above and other problems associated with cloud-specific FaaS models in order to achieve multi-cloud FaaS implementation using a cloud-neutral application function development framework. FIGS. 5 and 6 will be used to explain some illustrative embodiments.

More particularly, FIG. 5 illustrates an example 500 of program code with cloud-neutral function constructs, according to an illustrative embodiment. Example 500 highlights the ability of an application developer to write a multi-step, cloud-neutral FaaS model that enables function executions across multiple cloud platforms. As shown, FaaS model steps 1, 2, 3 and 4 are represented as 502-1, 502-2, 502-3 and 502-4. The first step 502-1 has been expanded in FIG. 5 to illustrate cloud-neutral code 504 used to implement the step.

Assume, for example, that the four steps in example 500 of FIG. 5 respectively correspond to the function executions in the chain of function executions implemented in example 200 of FIG. 2. Recall that the function executions in FIG. 2, i.e., insert object, process & store in first database, process & store in second database, and execute cognitive algorithm, are implemented within a single cloud platform. In contrast, these four functions can be implemented in the multi-step, cloud-neutral FaaS model of example 500 in FIG. 5, i.e., insert object (step 502-1), process & store in first database (step 502-2), process & store in second database (step 502-3), and execute cognitive algorithm (step 502-4).

Advantageously, as depicted in the cloud-neutral code 504 corresponding to step 502-1, rather than requiring cloud-specific FaaS code to store a given JPEG image file in an object store, cloud-neutral code 504 is written independent of any cloud-specific FaaS model such that the given JPEG image (.jpg) file can be inserted into an object store of any appropriate cloud platform (e.g., any cloud platform in the set of cloud platforms 104 of FIG. 1).

Similarly, cloud-neutral FaaS code is written by the application developer to implement the other steps in example 500, i.e., process & store in first database (step 502-2), process & store in second database (step 502-3), and execute cognitive algorithm (step 502-4). Advantageously, each step can be executed in a different cloud platform such that multi-cloud FaaS interoperability is realized.

FIG. 6 illustrates details of a cloud-neutral application function development framework 600 configured to process cloud-neutral FaaS code such as the code shown in FIG. 5. It is to be appreciated that the framework 600 of FIG. 6 may be implemented as part of framework 102 of FIG. 1, according to an illustrative embodiment.

As shown, the framework 600 provides a FaaS compiler 602 configured to parse and translate cloud-neutral FaaS application logic, e.g., program code in example 500 (steps 502-1, 502-2, 502-3 and 502-4) into the corresponding cloud-specific functions, i.e., code 604, for multiple cloud platforms on which the functions can be deployed and executed.

It is understood that the compiler 602 has access to cloud-specific FaaS models 606 so that it can perform the translation operations, e.g., translate the cloud-neutral object store action 504 (FIG. 5) to an object store action of a specific cloud platform (e.g., AWS® cloud platform). That is, the compiler 602 has access to a library of FaaS models (606) that is frequently updated with new vendor FaaS capabilities which are then normalized into cloud-neutral FaaS models. In this way, the framework 600 enables interoperability between multiple clouds with respect to a chain of function executions (e.g., cloud-neutral program code in example 500).

Further, in illustrative embodiments, the framework 600 is configured to use cloud provider costs and capabilities 608 to provide a recommendation 610 for which cloud platform would be most appropriate to deploy of the translated functions. More particularly, the compiler 602 has access to the capabilities and costs of a variety of cloud providers for information such as, but not limited to, function call costs, network bandwidth costs, storage costs, etc. The compiler 602 can then examine each FaaS step (e.g., 502-1, 502-2, 502-3 and 502-4) and determine a "best-fit" cloud for that step. If the next step would be best executed on a separate cloud, the compiler 602 is configured to factor in potential data movement and transfer costs as well. The compiler 602 can output a recommendation report which details which steps are best registered on which clouds at what costs, performance, etc. Thus, the recommendations can be automatically implemented, provided to the application developer to confirm before implementing, or some combination thereof.

Accordingly, once the developer has modeled application functions using a cloud-neutral multi-step process as described above, they can compile their code via compiler 602. The compiler 602 will then output the cloud-specific FaaS code 604 based on which cloud is the best choice for which step.

Furthermore, in one or more illustrative embodiments, the compiler 602 supports different logical switches to influence the recommendations 610 and/or the code results 604. These switches can emphasize lowest-cost, highest-performance, or other types of constraints.

Still further, when the compiler 602 is instructed to generate code which will span multiple clouds, the compiler is configured to write additional steps and insert these steps as FaaS functions that perform the transfers (and potentially return transfer of results) between clouds.

For example, a JPEG image file loaded into an AWS® S3 bucket can result in the compiler 602 generating a function that performs one of two operations:

(i) The JPEG image file is never actually stored in the AWS® S3 bucket, but rather a FaaS function is called which actually stores the object in an IBM Bluemix® object store. The compiler 602, for subsequent reads, thus generates a function which reads from this IBM Bluemix® object store.

(ii) The JPEG image file is stored in the AWS® S3 bucket, and then the compiler 602 generates a function to copy the JPEG image file over to an IBM Bluemix® object store for processing.

In addition, in one or more illustrative embodiments, once the code has been generated, it can be manually registered across multiple clouds.

Given the illustrative framework described above in the context of FIGS. 1-6, illustrative embodiments are provided that address the issue of resource constraint in cloud platforms that are executing portions of the translated program code in example 500 (cloud-specific translations of steps 502-1, 502-2, 502-3 and 502-4).

Recall that one of the inputs to the FaaS compiler 602 in FIG. 6 is a set of provider costs and capabilities. As part of these capabilities, providers often place limits on the amount of resources (e.g., memory, execution duration, etc.) available to FaaS code.

Accordingly, the benefits of FaaS (e.g., reduced complexity of maintaining/managing infrastructure) come with a significant set of challenges for developers wishing to leverage FaaS resources across multiple clouds. Some examples of these challenges are as follows.

Memory Allocation Limits

Different FaaS implementations across different cloud providers offer various limits in the range of memory that a function can use. For example, the AWS® 2017 offering limits a developer to a range of 128-1536 Megabytes (MB).

Memory Allocation Defaults

The default memory allocation for each cloud provider may be different. This may result in a significantly different performance profile for the same code.

Memory Rounding/Pricing

Some cloud providers (e.g., Azure®) round the memory usage up (e.g., to the nearest 128 MB) for pricing. This could have a significant (and unknown) cost impact to a developer.

Differing Behavior when Hitting Memory Limits

Some functions, when hitting memory limits (e.g., 1536 MB for AWS®), may experience different behavior across clouds. For example, if an AWS® function hits the memory limit, the function is terminated before completion.

CPU Execution Time/Duration

Some cloud providers place limits on the amount of time a function can execute (AWS® has a duration of 300 seconds, or Google® limits to 100,000 Gigahertz (GHz)-seconds per 100 seconds).

CPU Execution Time/Duration Pricing

Some cloud providers offer tiers of pricing for CPU execution billing. For example, Azure® offers monthly free grants of function execution up to a certain limit and then bills accordingly once the free limit has been reached.

CPU Execution Time/Duration Rounding

Some cloud providers always round up to a minimum execution time (no matter how short of a duration the function executed).

Temporary Storage

Different FaaS functions may require temporary storage (/tmp space) as part of their execution. For example, AWS® limits /tmp space to 512 MB.

Payload Invocation Size

The size of a function payload (e.g., parameters) may vary from cloud provider to cloud provider. For example, invoke requests on AWS® are limited to a payload size of 6 MB.

Synchronous Versus Asynchronous Payload Disparity

Some FaaS functions operate in a synchronous mode (request/response), while others operate asynchronously (event-based). These different operating models often have different payload sizes (e.g., over 20 times increased payload size for asynchronous functions on AWS®).

Deployment/Code Size Limits

When deploying packages (e.g., zip/jar files), certain platforms place limits on the size of the code/package that is allowed. For example, AWS® has limits of 50 MB for zip/jar file deployments.

Error Frameworks for Limit Exceptions

When these limits are exceeded, certain platforms may increase the set of resources dynamically, while others may throw exceptions. These exceptions are often thrown, for example, when the amount of memory is exceeded.

Number of Function Call Limits

Certain platforms may limit the number of function calls that may occur within a certain time period (e.g., Google® has a default of 1,000,000 calls per 100 seconds).

Bandwidth Limits

The amount of data moved in and out of a cloud by a FaaS invocation may be limited (e.g., Google® limits inbound/outbound socket data to 10 Gigabits (Gb) per 100 seconds by default). Domain name server (DNS) resolution calls can likewise be limited.

Figure 7:
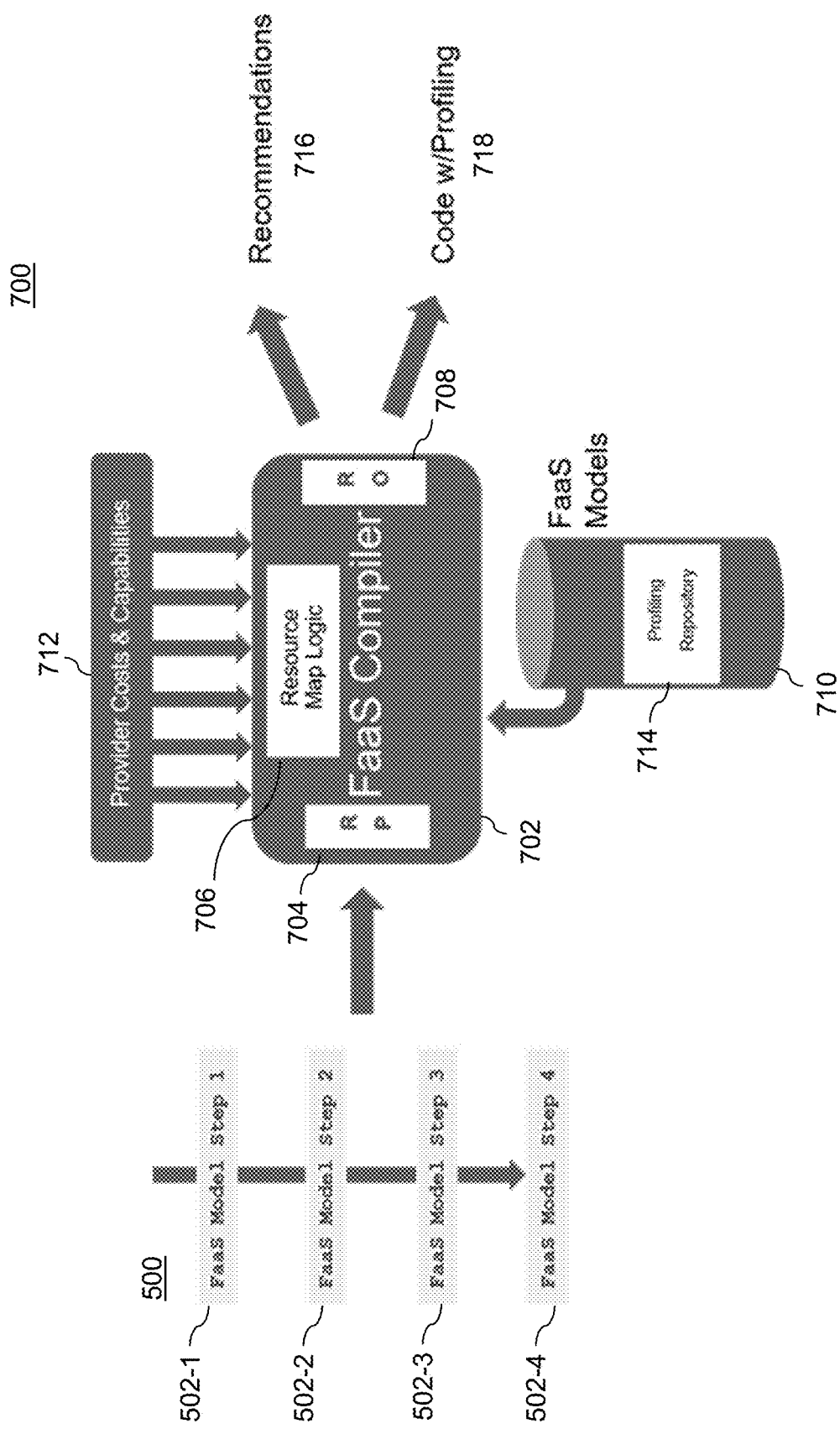
FIG. 7 illustrates a resource-aware cloud-neutral application function development framework, according to an illustrative embodiment.
Figure 8:
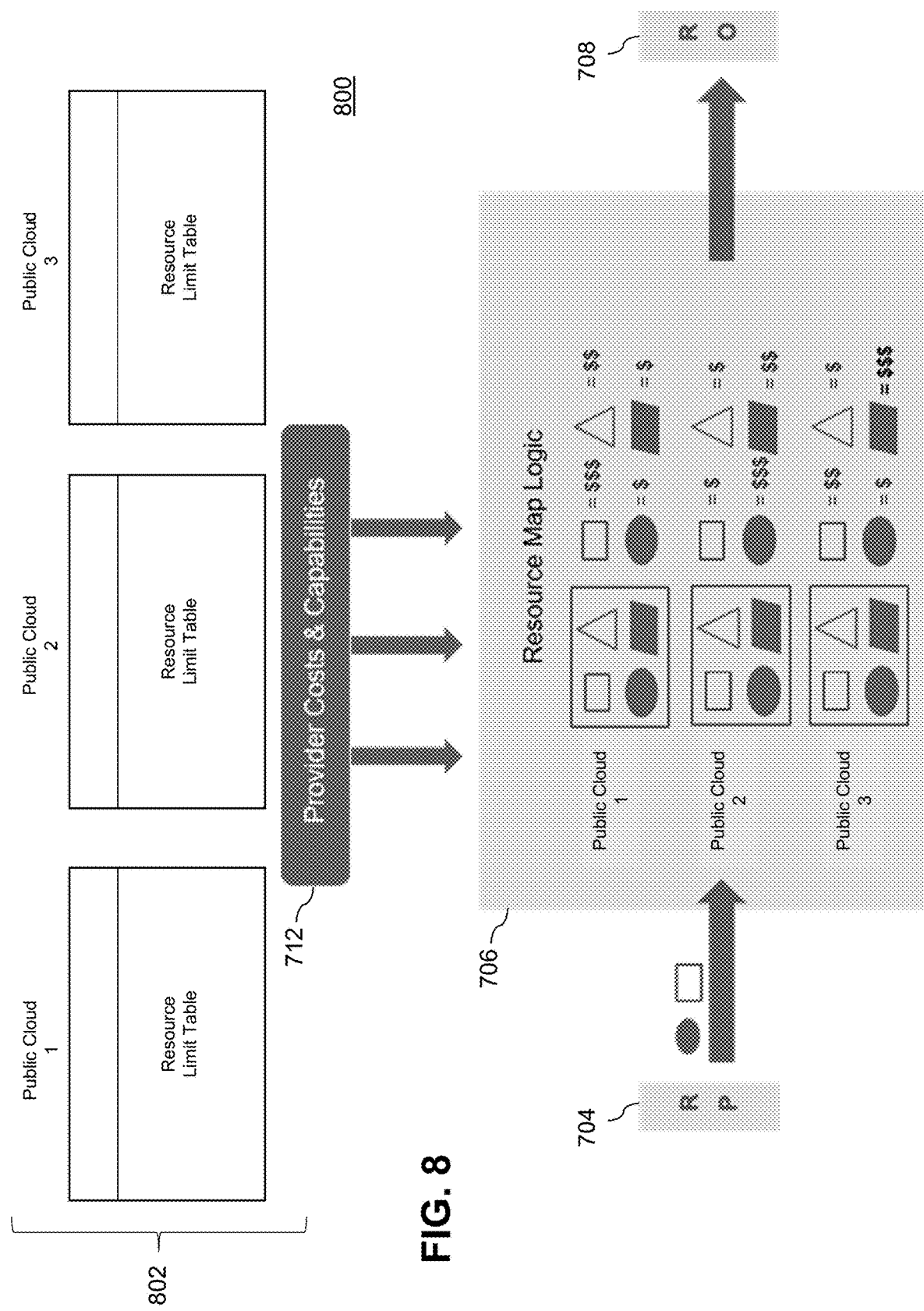
FIG. 8 illustrates resource mapping logic for a resource-aware cloud-neutral application function development framework, according to an illustrative embodiment.

Further illustrative embodiments overcome the above and other challenges by providing resource constraint optimization with respect to the cloud platforms that comprise the multi-cloud computing environment. More particularly, as will be further described in the context of FIGS. 7-9, illustrative embodiments provide for multi-cloud FaaS functions to be summarized into a cloud-neutral model of limits. Further, profiling of FaaS functions can be added to the code. The term "profiling" as used herein, refers to dynamic program analysis of software code that measures, by way of example only, the space (memory) or time (processing) complexity of a program, usage of particular instructions, frequency and duration of function calls, etc. Profiling can be achieved by instrumenting either the program source code or its binary executable form using a mechanism known as a code profiler. Examples of profilers include, but are not limited to, event-based profilers, statistical profilers, instrumented profilers, and simulation profilers. Embodiments are not limited to any particular profiling mechanism.

Still further, illustrative embodiments provision the FaaS compiler with business logic to predict resource usage of cloud-neutral FaaS code written by a developer. The compiler also is configured with processing logic (resource map logic) to take predicted resource usage of a function and map it to the most favorable (optimal) resource model across the plurality of cloud platforms of the multi-cloud computing environment. The resource map logic references a database of FaaS profiles. The compiler generates recommendations for FaaS placement based on predicted resources and/or code for cloud-specific FaaS functions that can be deployed to appropriate multi-cloud targets. Additionally or alternatively, the resource map logic of the FaaS compiler considers resource costs for each cloud platform in making the recommendation and/or code selection. Illustrative embodiments with such features will now be described below in the context of FIGS. 7 and 8.

FIG. 7 illustrates a resource-aware cloud-neutral application function development framework 700, according to an illustrative embodiment. Note that the resource-aware cloud-neutral application function development framework 700 in FIG. 7 is similar to framework 600 in FIG. 6. Thus, framework 700 is configured to process cloud-neutral FaaS code such as the code shown in FIG. 5. However, differing from framework 600, framework 700 provides resource optimization functionality that addresses resource constraints imposed by the cloud platforms upon which application functions will be executed. It is to be appreciated that the framework 700 of FIG. 7 may be implemented as part of framework 102 of FIG. 1, according to an illustrative embodiment.

As shown, the framework 700 provides a FaaS compiler 702 configured to parse and translate cloud-neutral FaaS application logic, e.g., program code in example 500 (steps 502-1, 502-2, 502-3 and 502-4) into the corresponding cloud-specific functions for multiple cloud platforms on which the functions can be deployed and executed. The FaaS compiler 702 also comprises a resource predictor (RP) 704, resource map logic 706, and a resource overlay (RO) 708, as will be further explained below.

The compiler 702 also has access to cloud-specific FaaS models 710 so that it can perform the translation operations, e.g., translate the cloud-neutral object store action 504 (FIG. 5) to an object store action of a specific cloud platform (e.g., AWS® cloud platform). That is, the compiler 702 has access to a library of FaaS models (710) that is frequently updated with new vendor FaaS capabilities which are then normalized into cloud-neutral FaaS models. In this way, the compiler 702 enables interoperability between multiple clouds with respect to a chain of function executions (e.g., cloud-neutral program code in example 500).

In addition, the compiler 702 has access cloud provider costs and capabilities 712, as described above. These costs and capabilities 712 also include resource constraints published by each of the cloud-specific FaaS models of the cloud platforms, i.e., limits on the amount of resources (e.g., memory, execution duration, etc.) available to FaaS code executed on a given cloud platform.

The FaaS compiler 702 is also configured to provide profiling functionality to track resource usage (e.g., complexity, runtime, memory usage, etc.) during FaaS runtime. The compiler 702 keeps track of the FaaS profiling information in a profiling repository 714 (e.g., this can be part of the FaaS model database 710 or be implemented at some other location(s) that can be referenced by the compiler 702). The profiling repository 714 builds up knowledge about how different types of function fragments end up using resources once they are deployed onto a multi-cloud computing environment (e.g., 104 in FIG. 1).

Further, resource predictor (RP) 704 is added to the front end of the compilation process. This RP process parses the FaaS model code, searches for coding constructs that it has seen before, and predicts the estimated resource usage that the FaaS function is likely to consume. This prediction is then passed on to the resource map logic 706.

The compiler 702 implements a resource mapping layer that is part of the resource map logic 706 to build a model of the resource constraints and pricing of each cloud platform. This layer accepts input from the RP 704 as well as the costs and capabilities (712) of each cloud. FIG. 8 illustrates an example 800 showing the functionalities of the resource mapping logic 706. It is assumed that the providers costs and capabilities 712 includes a set of resource limit tables 802 wherein each table specifies the resource constraints imposed by each cloud provider (public cloud 1, public cloud 2, public cloud 3) for FaaS code execution. Resource costs can be part of the set of tables 802 or they can be specified separately.

Example 800 graphically highlights the disparate limits/quotas and pricing ranges being passed into the resource map logic, which normalizes each quota into a model of resource limits and pricing. More particularly, rectangles, ovals, triangles, and parallelograms shown for each public cloud respectively represent a given resource limit, e.g., the rectangle represents CPU time execution/duration. Thus, as shown, the limit (rectangle, oval, triangle, parallelogram) and cost ($, $, $$$) for each resource is specified by the graphics shown in logic 706. Such a graphical model shown in FIG. 8 may be presented to the developer in some embodiments.

Returning now to FIG. 7, it is to be understood that RP 704 passes the predicted resource amounts into the logic 706, and the logic 706 decides, using the resource limit/ pricing model (FIG. 8), which resource overlay (RO) 708 would result in the best choice (optimal) to pass onto the recommendation output 716. Code with profiling 718 represents the cloud-specific FaaS code that is selected as the best choice to optimize the resource constraints of the corresponding cloud platform. The FaaS compiler 702 can initiate execution of the selected code automatically, or await approval from the developer (who receives the recommendation 716) before doing so. Thus, the FaaS compiler 702 selects the corresponding cloud platforms, for which the cloud-neutral application functions are translated, based on the one or more resource constraints associated with each of the plurality of cloud platforms.

Given the illustrative description of cloud-neutral application function development techniques herein, FIG. 9 depicts methodology for resource-aware cloud-neutral application function development in a multi-cloud computing environment, according to illustrative embodiments.

In FIG. 9, methodology 900 comprises the following steps. In a multi-cloud computing environment comprising a plurality of cloud platforms, wherein each of the cloud platforms supports a different cloud-specific application function model that enables execution of cloud-specific application functions thereon, step 902 obtains a set of cloud-neutral application functions developed in accordance with a cloud-neutral application function model. Further, step 904 translates the set of cloud-neutral application functions into a set of cloud-specific application functions that are executable across two or more of the plurality of cloud platforms of the multi-cloud computing environment, wherein at least one cloud-specific application function of the set of cloud-specific application functions is executable on a corresponding one of the cloud platforms and another cloud-specific application function of the set of cloud-specific application functions is executable on another corresponding one of the cloud platforms. Further, the corresponding cloud platforms for which the cloud-neutral application functions are translated are selected based on at least one of one or more resource constraints and one or more resource costs associated with each of the plurality of cloud platforms.

At least portions of the resource-aware cloud-neutral application function development framework for a multi-cloud computing environment shown in FIGS. 1-9 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 10.

As is apparent from the above, one or more of the processing modules or other components of the resource-aware cloud-neutral application function development framework for a multi-cloud computing environment shown in FIGS. 1-9 may each run on a computer, server, storage device or other processing platform element. A given such element may be viewed as an example of what is more generally referred to herein as a "processing device." An example of such a processing platform is processing platform 1000 shown in FIG. 10.

The processing platform 1000 in this embodiment comprises a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 10:
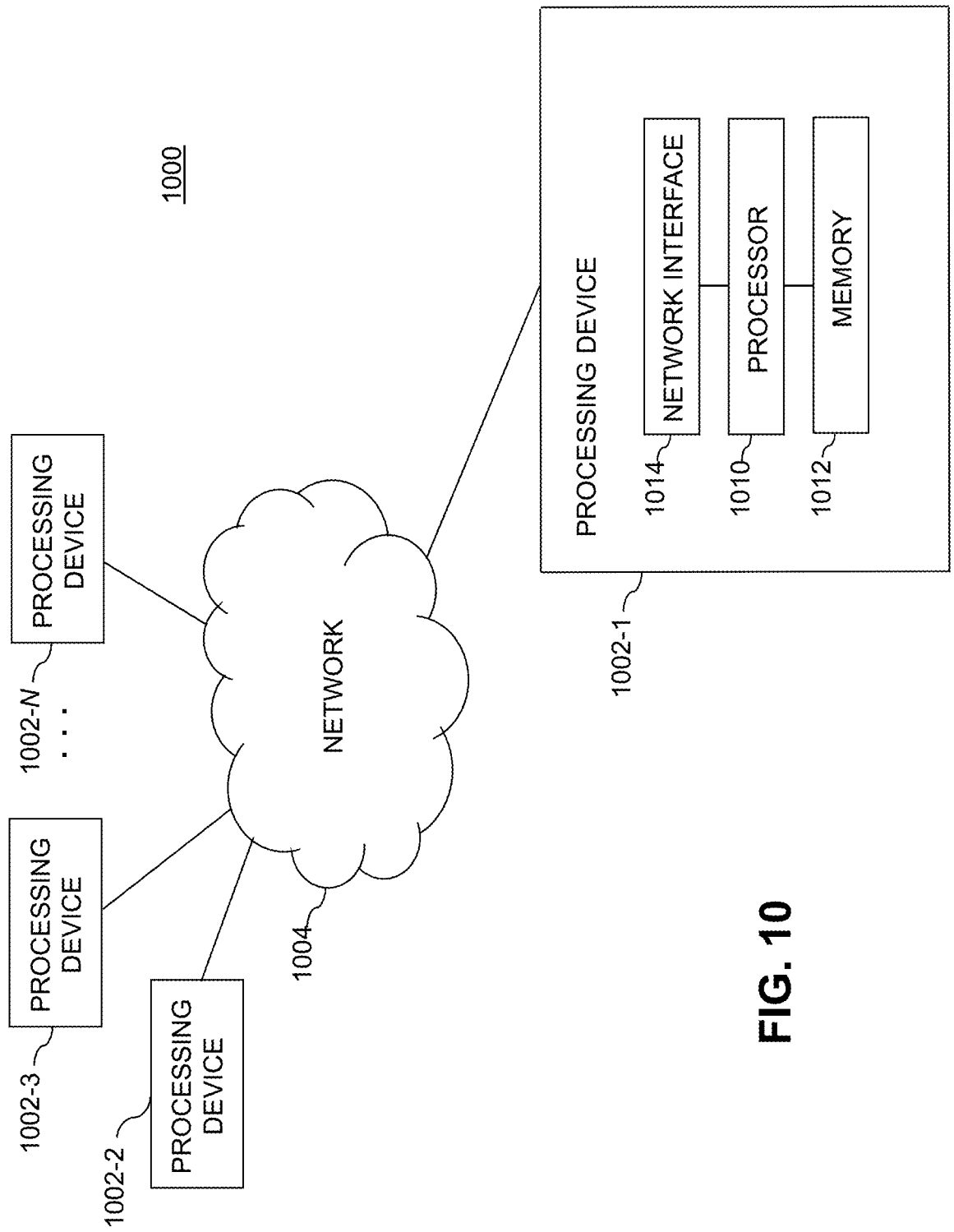
FIG. 10 illustrates a processing platform used to implement a multi-cloud computing environment with a resource-aware cloud-neutral application function development framework, according to an illustrative embodiment.

Also included in the processing device 1002-1 of the example embodiment of FIG. 10 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the resource-aware cloud-neutral application function development framework for a multi-cloud computing environment. Such components can communicate with other elements of the system over any type of network or other communication media.

As indicated previously, in some embodiments, components of the resource-aware cloud-neutral application function development framework for a multi-cloud computing environment as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
in a multi-cloud computing environment comprising a plurality of cloud platforms, wherein each of the cloud platforms supports a different cloud-specific application function model that enables execution of cloud-specific application functions thereon;
obtaining a set of cloud-neutral application functions developed in accordance with a cloud-neutral application function model; and
translating, by a compiler, the set of cloud-neutral application functions into a set of cloud-specific application functions that are executable across two or more of the cloud platforms of the multi-cloud computing environment, wherein at least one cloud-specific application function of the set of cloud-specific application functions is executable on a corresponding one of the cloud platforms and another cloud-specific application function of the set of cloud-specific application functions is executable on another corresponding one of the cloud platforms;
wherein translating the set of cloud-neutral application functions into a set of cloud-specific application functions further comprises generating one or more additional cloud-specific applications functions to effectuate interoperability between two or more of the cloud platforms;
wherein the corresponding cloud platforms for which the cloud-neutral application functions are to be translated are selected based on at least one or more resource constraints and one or more resource costs as provided by a resource predicator and a resource mapping logic of the compiler; wherein the resource predicator passes estimated resource usage to the resource mapping logic for recommendation output; and wherein the method is implemented via one or more processing devices each comprising a processor coupled to a memory.

2. The method of claim 1, further comprising profiling execution of one or more cloud-specific application functions on one or more of the cloud platforms.

3. The method of claim 2, wherein the profiling step acquires knowledge about how one or more cloud-specific application functions consume resources once deployed on the one or more cloud platforms.

4. The method of claim 2, further comprising utilizing results of the profiling step to assist in selecting the cloud platforms for which the cloud-neutral application functions are translated.

5. The method of claim 1, further comprising predicting resource usage for one or more cloud-specific application functions executing on one or more of the cloud platforms.

6. The method of claim 5, further comprising utilizing the predicted resource usage to assist in selecting the cloud platforms for which the cloud-neutral application functions are translated.

7. The method of claim 1, further comprising building a resource mapping model that represents resource constraints and pricing for each of the cloud platforms.

8. The method of claim 7, further comprising utilizing the resource mapping model to assist in selecting the cloud platforms for which the cloud-neutral application functions are translated.

9. The method of claim 1, wherein the set of cloud-specific application functions are instrumented with profiling code.

10. The method of claim 1, wherein the resource mapping logic determines an optimal resource overlay.

11. The method of claim 1, wherein each of the cloud-specific application function models is in the form of a cloud-specific Function-as-a-Service (FaaS) model.

12. The method of claim 1, wherein the plurality of cloud platforms comprises a combination of private and public cloud platforms.

13. An article of manufacture comprising a non-transitory processor-readable storage medium having stored therein program code of one or more software programs, wherein the program code when executed by at least one processing device causes said at least one processing device to perform steps of:
- in a multi-cloud computing environment comprising a plurality of cloud platforms, wherein each of the cloud platforms supports a different cloud-specific application function model that enables execution of cloud-specific application functions thereon;
- obtaining a set of cloud-neutral application functions developed in accordance with a cloud-neutral application function model;
- translating, by a compiler, the set of cloud-neutral application functions into a set of cloud-specific application functions that are executable across two or more of the cloud platforms of the multi-cloud computing environment, wherein at least one cloud-specific application function of the set of cloud-specific application functions is executable on a corresponding one of the cloud platforms and another cloud-specific application function of the set of cloud-specific application functions is executable on another corresponding one of the cloud platforms;
- wherein translating the set of cloud-neutral application functions into a set of cloud-specific application functions further comprises generating one or more additional cloud-specific applications functions to effectuate interoperability between two or more of the recommended cloud platforms and
- wherein the corresponding cloud platforms for which the cloud-neutral application functions are to be translated are selected based on at least one or more resource constraints and one or more resource costs as provided by a resource predicator and a resource mapping logic of the compiler; wherein the resource predicator passes estimated resource usage to the resource mapping logic for recommendation output.

14. The article of manufacture of claim 13, wherein the resource mapping logic determines an optimal resource overlay.

15. A system comprising:
- in a multi-cloud computing environment comprising a plurality of cloud platforms, wherein each of the cloud platforms supports a different cloud-specific application function model that enables execution of cloud-specific application functions thereon;
- one or more processing devices configured to implement a compiler, wherein the compiler is configured to: obtain a set of cloud-neutral application functions developed in accordance with a cloud-neutral application function model;
- translate, by a compiler, the set of cloud-neutral application functions into a set of cloud-specific application functions that are executable across two or more of the cloud platforms of the multi-cloud computing environment, wherein at least one cloud-specific application function of the set of cloud-specific application functions is executable on a corresponding one of the cloud platforms and another cloud-specific application function of the set of cloud-specific application functions is executable on another corresponding one of the cloud platforms;
- wherein translating the set of cloud-neutral application functions into a set of cloud-specific application functions further comprises generating one or more additional cloud-specific applications functions to effectuate interoperability between two or more of the recommended cloud platforms and
- wherein the corresponding cloud platforms for which the cloud-neutral application functions are to be translated are selected based on at least one or more resource constraints and one or more resource costs as provided by a resource predicator and a resource mapping logic of the compiler; wherein the resource predicator passes estimated resource usage to the resource mapping logic for recommendation output.

16. The system of claim 15, wherein the compiler is further configured to profile execution of one or more cloud-specific application functions on one or more of the cloud platforms.

17. The system of claim 15, wherein the compiler is further configured to predict resource usage for one or more cloud-specific application functions executing on one or more of the cloud platforms.

18. The system of claim 15, wherein the compiler is further configured to build a resource mapping model that represents resource constraints and pricing for each of the cloud platforms.

19. The system of claim 15, wherein the set of cloud-specific application functions are instrumented with profiling code.

20. The system of claim 15, wherein the resource mapping logic determines an optimal resource overlay.

* * * * *

UNITED STATES PATENT AND TRADEMARK OFFICE
CERTIFICATE OF CORRECTION

PATENT NO. : 10,671,360 B1
APPLICATION NO. : 15/894387
DATED : June 2, 2020
INVENTOR(S) : Stephen J. Todd et al.

It is certified that error appears in the above-identified patent and that said Letters Patent is hereby corrected as shown below:

In the Claims

Claim 1, Column 14, Line 41, please delete "resource predicator" and insert therefor --resource predictor--

Claim 1, Column 14, Line 42, please delete "resource predicator" and insert therefor --resource predictor--

Claim 13, Column 15, Line 51, please delete "resource predicator" and insert therefor --resource predictor--

Claim 13, Column 15, Line 52, please delete "resource predicator" and insert therefor --resource predictor--

Claim 15, Column 16, Line 35, please delete "resource predicator" and insert therefor --resource predictor--

Claim 15, Column 16, Line 36, please delete "resource predicator" and insert therefor --resource predictor--

Signed and Sealed this
Seventh Day of March, 2023

Katherine Kelly Vidal
*Director of the United States Patent and Trademark Office*